United States Patent
Buellesfeld et al.

(10) Patent No.: US 10,501,359 B2
(45) Date of Patent: Dec. 10, 2019

(54) METHOD FOR CONTROLLING THE THICKNESS OF A SUBSTRATE

(71) Applicant: SCHOTT AG, Mainz (DE)

(72) Inventors: Frank Buellesfeld, Kriftel (DE); Ulrich Lange, Mainz (DE); Georg Haselhorst, Schmitten (DE)

(73) Assignee: SCHOTT AG, Mainz (DE)

( * ) Notice: Subject to any disclaimer, the term of this patent is extended or adjusted under 35 U.S.C. 154(b) by 332 days.

(21) Appl. No.: 15/424,611

(22) Filed: Feb. 3, 2017

(65) Prior Publication Data

US 2017/0225994 A1 Aug. 10, 2017

(30) Foreign Application Priority Data

Feb. 4, 2016 (DE) .......... 10 2016 102 007

(51) Int. Cl.
*C03B 23/037* (2006.01)
*C03B 17/06* (2006.01)
*C03B 29/08* (2006.01)
*C03B 29/16* (2006.01)

(52) U.S. Cl.
CPC .......... *C03B 23/037* (2013.01); *C03B 17/064* (2013.01); *C03B 17/067* (2013.01); *C03B 29/08* (2013.01); *C03B 29/16* (2013.01); *C03B 2205/40* (2013.01)

(58) Field of Classification Search
None
See application file for complete search history.

(56) References Cited

U.S. PATENT DOCUMENTS

| 8,904,822 B2 | 12/2014 | LeBlanc et al. |
| 2003/0145624 A1 | 8/2003 | Luettgens et al. |
| 2007/0014949 A1* | 1/2007 | Bhatnagar ......... H01L 21/67115 428/34.4 |
| 2012/0318024 A1* | 12/2012 | Mori .................... B65H 23/195 65/90 |
| 2015/0000345 A1* | 1/2015 | Jiao ........................ C03B 18/02 65/158 |
| 2016/0158880 A1* | 6/2016 | Koitzsch .............. B23K 26/046 |

FOREIGN PATENT DOCUMENTS

| DE | 10030388 | 1/2002 |
| DE | 10128636 | 8/2002 |
| DE | 102008063554 | 6/2010 |
| EP | 2799404 | 11/2014 |

* cited by examiner

Primary Examiner — Lisa L Herring
(74) Attorney, Agent, or Firm — Ohlandt, Greeley, Ruggiero & Perle, L.L.P.

(57) ABSTRACT

A method for controlling the thickness of a glass ribbon and an article produced thereby are provided. The method includes: providing a glass ribbon by drawing from a melt or redrawing from a preform; predefining a nominal thickness of the glass ribbon; determining the thickness of the glass ribbon over its entire net width; determining at least one deviation of the thickness of the glass ribbon from the predefined nominal thickness; identifying the area of the thickness deviation in the glass ribbon; and heating the area of the at least one thickness deviation in the glass ribbon using a laser, so that the glass ribbon attains the predefined thickness.

10 Claims, 3 Drawing Sheets

METHOD FOR CONTROLLING THE THICKNESS OF A SUBSTRATE

CROSS REFERENCE TO RELATED APPLICATIONS

This application claims benefit under 35 U.S.C. § 119(a) of German Patent Application No. 10 2016 102 007.9, filed Feb. 4, 2016, the entire contents of which are incorporated herein by reference.

BACKGROUND

1. Field of the Invention

The invention relates to a method for controlling the thickness of a substrate, for example a glass or plastic substrate, and also relates to a substrate produced in this way.

2. Description of Related Art

Methods for producing substrates, for example glass or plastic substrates, have long been known. For example, document DE 101 28 636 C1 discloses a method in which the thickness of a flat glass is selectively influenced, and also a device for carrying out such method. In this case, a flat glass is conveyed, directly after shaping, past a device which extends over the entire width of the glass ribbon and which causes controlled cooling of the glass, and moreover the glass can be heated selectively and adjustably over its entire width, through local heat supply by means of a laser beam. This laser beam is driven across the width of the glass ribbon at a high frequency, and its output power is selectively adjusted, so that an appropriate heating power is achieved with spatial resolution. In this manner, a flat glass is obtained which has a most constant thickness possible across its width.

Furthermore, DE 10 2008 063 554 A1 describes a method and an apparatus for producing flat glass, in which the thickness can also be selectively influenced over the width of the glass. In this case, a glass ribbon is drawn through a slotted nozzle and is then guided into a drawing chamber, which is configured so as to have one wall exhibiting locally varying radiation absorption and/or thermal conductivity at least in sections across the width of the glass ribbon. Furthermore, for promoting thickness control, a laser beam may locally influence the glass ribbon. Additionally, a gas flow may also selectively locally influence the thickness of the ribbon. In this way, a glass ribbon is obtained with a desired thickness profile adjustable across the width thereof, for example with a greater glass thickness in the center of the ribbon than towards the edges thereof.

U.S. Pat. No. 8,904,822 B2 discloses a method by which a glass or plastic substrate with controlled thickness is obtained. In this method, a glass or plastic ribbon is drawn by applying a tension at the edges of the ribbon. Furthermore, the thickness of the ribbon is determined and controlled. If a deviation in thickness is detected, the portion of this thickness deviation is selected, this portion being in a viscous state. Then, this selected portion which is in a viscous state is heated by directing a laser beam thereto. Due to the heating, the portion then attains the predetermined thickness. The heating comprises controlling the laser power, the holding time of the laser on the selected portion, and/or adjustment of the wavelength of the laser.

However, all of these methods have a number of drawbacks.

For example, in all cases the material is drawn by exerting a pulling force, for example by so-called edge rolls contacting the glass in the edge portions of the ribbon. However, this causes surface damage of the ribbon at locations contacted by the edge rolls, so that in this way it is not possible to utilize the entire width of the ribbon.

If, for example, a gas flow acts on the ribbon via nozzles for controlling the thickness, waviness will additionally be caused across the net width of the ribbon as a result of the width of the nozzle and the spacing between the surface cooled by the nozzle and the glass. For example, the resolution of such nozzles is approximately 30 mm, so that in this way a slight waviness with a periodicity or wavelength of less than 30 mm cannot be eliminated in the ribbon. Here, net width refers to the portion of the glass ribbon in which the properties of the glass ribbon are within the predetermined specifications. The net width of a glass ribbon is therefore the width of the quality portion of the glass ribbon and usually results from the drawn glass ribbon when separating the edge portions also referred to as borders.

Furthermore, measures for influencing the thickness of a glass or plastic ribbon are taking effect in a region in which the ribbon is in the viscous state. This viscous state is defined as a region in which viscosity is greater than $10^5$ dPa·s, as can be seen, for example, from U.S. Pat. No. 8,904,822 B2. In order to guarantee sufficient heating of the material so that the material of the ribbon is sufficiently flowable in order to achieve a reduction in thickness, very high output powers have to be applied in this manner. However, the process not only becomes cost-intensive in this way, but additionally the high energies or output powers of the laser beam impede thickness control to be performed with sufficient precision, so that some variations in thickness across the net width of the glass or plastic ribbon continue to exist.

Thus, there is a need for a method for controlled adjustment of the thickness of a glass or plastic ribbon, which mitigates the existing drawbacks of the prior art.

SUMMARY

It is an object of the invention to provide an improved method for controlled adjustment of the thickness of a glass or plastic ribbon.

A further aspect of the invention consists in the provision of a sheet glass that exhibits extremely low thickness variation, in particular without waviness of a wavelength or periodicity of more than 5 mm.

The invention is achieved in a surprisingly simple manner by a method and by a sheet glass as disclosed herein.

The method of the invention for controlling the thickness of a glass ribbon comprises at least the following steps. Providing a glass ribbon by drawing from a melt or redrawing from a preform with a drawing rate $v_{GB}$ and an average thickness D in the net portion. Predefining a nominal thickness of the glass ribbon over a net width thereof. The net width of the glass ribbon is defined as the width of the glass ribbon within which the properties of the glass ribbon are within the specified limits, which therefore will be available for later marketing of the finished glass ribbon. Thus, the net width B of the glass ribbon is the width B of the quality portion thereof. Determining the thickness of the glass ribbon over its entire net width. Determining at least one deviation of the thickness of the glass ribbon from the predefined nominal thickness. Identifying the area of the thickness deviation in the glass ribbon. Heating the area of the at least one thickness deviation in the glass ribbon using a laser. The laser acts on the area of the thickness deviation so as to heat it. The heating causes the area to attain the predefined thickness. The heating furthermore comprises controlling at least a power of the laser beam, a duration of irradiation of the laser beam, and/or a wavelength of the laser as a function of the thickness of the glass ribbon determined in the quality portion thereof, that is to say the portion in which the properties of the glass ribbon are within the predefined limits and which therefore is suitable for being utilized later, for example for being marketed.

According to the method of the invention, the laser is equipped with a scanning head such that the entire net width of the glass ribbon can be scanned. The following relationship applies for the net width B of the glass ribbon, i.e. the width B of the quality portion of the glass ribbon, the drawing rate of the glass ribbon $v_{GB}$, the beam diameter D of the laser beam, and the scanning rate of the laser $v_{Las}$, and a correction factor k:

$$2 \cdot k \cdot v_{GB} \cdot B < D \cdot v_{Las}.$$

With the invention it is easily possible according to the method to reduce occurring thickness deviations to a single manipulated variable, the correction factor k, and to adjust the further changes in processing parameters based thereon. The k value has to be chosen so that the laser is incident at least once on each location of the area.

Therefore, the correction factor k is at least equal to 1. Preferably k is greater than 1. However, depending on the beam profile k may as well assume other values, for example k may preferably be greater than 10, or at least equal to 10.

In a further embodiment of the invention, the laser beam acts on the glass ribbon where the latter has a viscosity in a range between $10^4$ and $10^9$ dPa·s, preferably between $10^4$ and $10^8$ dPa·s during the cooling process without the impact of the laser beam. Areas of excessive thickness are subjected to a higher laser power than areas of appropriate or undersized thickness.

According to a further embodiment of the invention, the optical distance between the glass ribbon and the scanner mirror is between at least 1.8 and at most 5.0 m. In the context of the present invention, optical distance refers to the length of the optical path between the glass ribbon and the scanner mirror. Therefore, the terms "optical distance" and "optical path length" are used synonymously within the context of the present invention. The optical path may as well be shorter if optical components (e.g. in the form of mirrors and/or lenses) are utilized between the scanner mirror and the glass ribbon for optically enlarging the angular deflection of the scanner mirror. In such a case, the specified distance then refers to the "optical lever", that is the distance which would be required to achieve the same deflection of the laser beam without the one or more optical component(s).

According to yet another embodiment of the invention, laser power is at most 3000 W, preferably at most 2000 W, and more preferably at most 1500 W.

The laser radiation preferably acts on the deformation zone of the glass ribbon.

According to a further preferred embodiment of the invention, the drawing of the glass ribbon occurs by virtue of the own weight of the glass ribbon. This means that no tension is applied, in particular no tension at the edges of the glass ribbon.

According to one embodiment of the invention, the laser is a $CO_2$ laser.

Preferably, the thickness of the glass ribbon is determined by interference measurement, chromatic confocal measurement, white light topography, and/or white light interferometry.

According to a further preferred embodiment of the invention, the laser beam is directed by means of a galvanometer scanner and/or a polygon mirror wheel.

According to a further aspect of the invention, the method according to the invention for controlling the thickness of a ribbon furthermore comprises a method for controlling the thickness between a first and a second face of at least one selected area of a glass or plastic substrate which does not exhibit waviness of greater than 5 mm in wavelength, preferably no waviness of greater than 1 mm in wavelength, the method comprising at least the steps of: providing a molten glass or plastic; shaping the molten glass or plastic into a ribbon; monitoring a thickness of the ribbon; detecting at least one thickness deviation in the ribbon; selecting at least one area of the substrate in the viscous state, the at least one area corresponding to the area of the detected thickness deviation; and heating the at least one selected area of the ribbon in the viscous state using a laser beam which is directed so as to act on the selected area, wherein the heating causes the at least one selected area of the ribbon to attain a predetermined thickness, and wherein the heating furthermore comprises at least controlling the power, the holding time, or the wavelength of the laser beam acting on the selected area as a function of the monitored thickness.

According to a further aspect of the invention, the shaping of the molten glass or plastic into a ribbon does not comprise applying a tension at the edges of the ribbon, and the heating of the at least one selected area occurs in the viscous state thereof.

According to yet another aspect, the shaping comprises applying a tension at the edges of the ribbon, and the heating of the at least one selected area is performed in the liquid state, liquid state referring to a state in which the viscosity of the ribbon is less than $10^9$ dPa·s.

According to one embodiment of the invention, the laser is equipped with a scanning head such that the entire net width of the ribbon can be scanned. Furthermore, the following relationship applies between the drawing rate of the ribbon $v_B$, the net width of the ribbon B, the beam diameter D of the laser beam, and the scanning rate of the laser $v_{Las}$, and a correction factor k:

$$2 \cdot k \cdot v_B \cdot B < D \cdot v_{Las}. \quad (1)$$

Here, the net width of the ribbon B and the beam diameter D are given in meters, and the scanning rate $v_{Las}$ and the ribbon advance rate $v_B$ are given in meters per second.

The correction factor k is at least equal to 1. Preferably k is greater than 1. However, depending on the beam profile k may as well assume other values, for example k may most preferably be greater than 10, or at least equal to 10.

According to a further embodiment of the invention, the optical distance (or length of the optical path) between the ribbon and the scanner mirror is between at least 1.8 m and at most 5.0 m. The optical path may be shorter if optical components (e.g. mirrors or lenses) are utilized between the scanner mirror and the ribbon for enlarging the angular deflection of the scanner mirror. In such a case, the specified distance then refers to the "optical lever", i.e. the distance which would be required to achieve the same deflection of the laser beam without the optical component.

According to yet another embodiment of the invention, the scanning head includes a galvanometer drive and/or a polygonal mirror wheel.

Laser power is preferably at most 3000 W, more preferably less than 2000 W, and most preferably less than 1500 W.

According to a particularly preferred embodiment of the invention, the drawing of the ribbon occurs by virtue of its own weight. This means in particular that no further means are necessary to achieve the drawing of the ribbon from the melt, rather drawing is achieved without external force, solely under the influence of gravity.

According to yet another embodiment of the invention, the laser is a $CO_2$ laser.

The monitoring of the thickness of the ribbon is preferably achieved by interference measurement, chromatic confocal measurement, white light topography, and/or white light interferometry.

In a further embodiment of the invention, the heating comprises directing the laser beam from a laser beam generating device to a reflective surface and reflecting the laser beam there towards the at least one selected area.

According to yet another embodiment of the invention, the laser beam is successively directed to a plurality of selected areas of the ribbon.

According to a further embodiment of the invention, this plurality of selected areas may extend over the entire net width of the ribbon.

Furthermore, for each of the selected areas at least the power, the holding time, and/or the wavelength of the laser beam can be selectively controlled and adjusted.

According to a further embodiment of the invention, the laser beam is at least partially absorbed in the ribbon and consequently does not pass through the ribbon unimpededly.

At least partially absorbed herein means an absorption of at least 20% of the output power of the laser beam in the ribbon. So, according to one embodiment of the invention at least 20% of the output power of the laser beam is absorbed within the ribbon.

According to a further embodiment of the invention, the molten material, that is to say the molten glass or the molten plastic, for example, is provided in a melting process with subsequent shaping or in a redrawing process by heating a preform made of glass or plastics.

Hot forming may be accomplished in a float process, a drawing process, for example a down-draw process, or in an overflow fusion process.

The method of the invention in particular permits to obtain a sheet glass exhibiting a particularly uniform thickness distribution.

With regard to the thickness distribution of a ribbon made of a material, the following parameters are of particular importance. On the one hand, the variation of the thickness over the entire net width of the ribbon is relevant. This variation in thickness over the net width of the ribbon is referred to as 'total thickness variation' (ttv). Moreover, thickness variations of a small amplitude but a certain periodicity or wavelength may be caused, for example by blowing nozzles during the shaping process of the ribbon. This so-called 'waviness' is described more precisely by specifying the wavelength or periodicity thereof.

By contrast, with the method of the invention it is possible to produce a sheet glass in which both thickness variation and waviness are significantly reduced.

The flat glass of the invention has a thickness of 300 µm or less, preferably of 150 µm or less, more preferably of 100 µm or less, and most preferably of 50 µm or less, and a thickness variation of not more than 25 µm, preferably not more than 15 µm, more preferably not more than 10 µm, and most preferably not more than 5 µm, based on wafer or substrate sizes in a range of more than 100 mm in diameter, in particular with a lateral dimension of 100 mm×100 mm or more, preferably based on wafer or substrate sizes in a range of more than 200 mm in diameter, in particular with a lateral dimension of 200 mm×200 mm or more, and most preferably based on wafer or substrate sizes in a range of more than 400 mm in diameter, in particular with a lateral dimension of 400 mm×400 mm, and furthermore it is free of waviness of more than 5 mm in wavelength, preferably free of waviness of more than 3 mm in wavelength, and most preferably free of waviness of more than 1 mm in wavelength.

The flat glass furthermore is preferably an alkali silicate glass, an alkali alkaline earth silicate glass, a soda-lime glass, a mixed-alkali lime silicate glass, a boron silicate glass, a phosphate silicate glass, a boron phosphate silicate glass, an aluminum silicate glass, an alkali aluminum silicate glass, an alkali alkaline earth aluminum silicate glass, a boron aluminum silicate glass, or a boron phosphate aluminum silicate glass.

According to one embodiment of the invention, the glass is a boron silicate glass having the following composition, in wt %:

| | |
|---|---|
| $SiO_2$ | 64.0, |
| $B_2O_3$ | 8.3, |
| $Al_2O_3$ | 4.0, |
| $Na_2O$ | 6.5, |
| $K_2O$ | 7.0, |
| ZnO | 5.5, |
| $TiO_2$ | 4.0, |
| $Sb_2O_3$ | 0.6, and |
| $Cl^-$ | 0.1. |

With this composition, the following properties are obtained:

| | |
|---|---|
| $\alpha_{(20\text{-}300)}$ | $7.2 \cdot 10^{-6}/K$ |
| $T_g$ | 557° C. |
| Density | 2.5 g/cm$^3$. |

According to a further embodiment of the invention, the glass is a boron silicate glass having the following composition, in wt %:

| | |
|---|---|
| $SiO_2$ | 80 +/− 5, |
| $B_2O_3$ | 13 +/− 5, |
| $Al_2O_3$ | 2.5 +/− 2, |
| $Na_2O$ | 3.5 +/− 2, and |
| $K_2O$ | 1 +/− 1. |

With this composition, the following properties are obtained:

| | |
|---|---|
| $\alpha_{(20\text{-}300)}$ | $3.25 \cdot 10^{-6}/K$ |
| $T_g$ | 525° C. |
| Density | 2.2 g/cm$^3$. |

According to a further embodiment, the thin glass is a lithium aluminum silicate glass having the following composition (in wt %):

| Composition | (wt %) |
|---|---|
| $SiO_2$ | 55-69, |
| $Al_2O_3$ | 18-25, |
| $Li_2O$ | 3-5, |

| Composition | (wt %) |
| --- | --- |
| $Na_2O + K_2O$ | 0-30, |
| $MgO + CaO + SrO + BaO$ | 0-5, |
| ZnO | 0-4, |
| $TiO_2$ | 0-5, |
| $ZrO_2$ | 0-5, |
| $TiO_2 + ZrO_2 + SnO_2$ | 2-6, |
| $P_2O_5$ | 0-8, |
| F | 0-1, and |
| $B_2O_3$ | 0-2. |

Optionally, coloring oxides may be added, such as $Nd_2O_3$, $Fe_2O_3$, CoO, NiO, $V_2O_5$, $MnO_2$, $TiO_2$, CuO, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass ribbon, and the total amount of the total composition is 100 wt %.

Preferably, the lithium aluminosilicate glass of the invention has the following composition (in wt %):

| Composition | (wt %) |
| --- | --- |
| $SiO_2$ | 57-66, |
| $Al_2O_3$ | 18-23, |
| $Li_2O$ | 3-5, |
| $Na_2O + K_2O$ | 3-25, |
| $MgO + CaO + SrO + BaO$ | 1-4, |
| ZnO | 0-4, |
| $TiO_2$ | 0-4, |
| $ZrO_2$ | 0-5, |
| $TiO_2 + ZrO_2 + SnO_2$ | 2-6, |
| $P_2O_5$ | 0-7, |
| F | 0-1, and |
| $B_2O_3$ | 0-2. |

Optionally, coloring oxides may be added, such as $Nd_2O_3$, $Fe_2O_3$, CoO, NiO, $V_2O_5$, $MnO_2$, $TiO_2$, CuO, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass ribbon, and the total amount of the total composition is 100 wt %.

Most preferably, the lithium aluminosilicate glass of the invention has the following composition (in wt %):

| Composition | (wt %) |
| --- | --- |
| $SiO_2$ | 57-63, |
| $Al_2O_3$ | 18-22, |
| $Li_2O$ | 3.5-5, |
| $Na_2O + K_2O$ | 5-20, |
| $MgO + CaO + SrO + BaO$ | 0-5, |
| ZnO | 0-3, |
| $TiO_2$ | 0-3, |
| $ZrO_2$ | 0-5, |
| $TiO_2 + ZrO_2 + SnO_2$ | 2-5, |
| $P_2O_5$ | 0-5, |
| F | 0-1, and |
| $B_2O_3$ | 0-2. |

Optionally, coloring oxides may be added, such as $Nd_2O_3$, $Fe_2O_3$, CoO, NiO, $V_2O_5$, $MnO_2$, $TiO_2$, CuO, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass ribbon, and the total amount of the total composition is 100 wt %.

According to one embodiment, the thin glass is a soda-lime glass having the following composition (in wt %):

| Composition | (wt %) |
| --- | --- |
| $SiO_2$ | 40-81, |
| $Al_2O_3$ | 0-6, |
| $B_2O_3$ | 0-5, |
| $Li_2O + Na_2O + K_2O$ | 5-30, |
| $MgO + CaO + SrO + BaO + ZnO$ | 5-30, |
| $TiO_2 + ZrO_2$ | 0-7, and |
| $P_2O_5$ | 0-2. |

Optionally, coloring oxides may be added, such as $Nd_2O_3$, $Fe_2O_3$, CoO, NiO, $V_2O_5$, $MnO_2$, $TiO_2$, CuO, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass ribbon, and the total amount of the total composition is 100 wt %.

Preferably, the soda-lime glass of the present invention has the following composition (in wt %):

| Composition | (wt %) |
| --- | --- |
| $SiO_2$ | 50-81, |
| $Al_2O_3$ | 0-5, |
| $B_2O_3$ | 0-5, |
| $Li_2O + Na_2O + K_2O$ | 5-28, |
| $MgO + CaO + SrO + BaO + ZnO$ | 5-25, |
| $TiO_2 + ZrO_2$ | 0-6, and |
| $P_2O_5$ | 0-2. |

Optionally, coloring oxides may be added, such as $Nd_2O_3$, $Fe_2O_3$, CoO, NiO, $V_2O_5$, $MnO_2$, $TiO_2$, CuO, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass ribbon, and the total amount of the total composition is 100 wt %.

Most preferably, the soda-lime glass of the present invention has the following composition (in wt %):

| Composition | (wt %) |
| --- | --- |
| $SiO_2$ | 55-76, |
| $Al_2O_3$ | 0-5, |
| $B_2O_3$ | 0-5, |
| $Li_2O + Na_2O + K_2O$ | 5-25, |
| $MgO + CaO + SrO + BaO + ZnO$ | 5-20, |
| $TiO_2 + ZrO_2$ | 0-5, and |
| $P_2O_5$ | 0-2. |

Optionally, coloring oxides may be added, such as $Nd_2O_3$, $Fe_2O_3$, CoO, NiO, $V_2O_5$, $MnO_2$, $TiO_2$, CuO, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass ribbon, and the total amount of the total composition is 100 wt %.

According to one embodiment, the thin glass is a borosilicate glass of the following composition (in wt %):

| Composition | (wt %) |
|---|---|
| $SiO_2$ | 60-85, |
| $Al_2O_3$ | 0-10, |
| $B_2O_3$ | 5-20, |
| $Li_2O + Na_2O + K_2O$ | 2-16, |
| $MgO + CaO + SrO + BaO + ZnO$ | 0-15, |
| $TiO_2 + ZrO_2$ | 0-5, and |
| $P_2O_5$ | 0-2. |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass ribbon, and the total amount of the total composition is 100 wt %.

More preferably, the borosilicate glass of the present invention has the following composition (in wt %):

| Composition | (wt %) |
|---|---|
| $SiO_2$ | 63-84, |
| $Al_2O_3$ | 0-8, |
| $B_2O_3$ | 5-18, |
| $Li_2O + Na_2O + K_2O$ | 3-14, |
| $MgO + CaO + SrO + BaO + ZnO$ | 0-12, |
| $TiO_2 + ZrO_2$ | 0-4, and |
| $P_2O_5$ | 0-2. |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass ribbon, and the total amount of the total composition is 100 wt %.

Most preferably, the borosilicate glass has the following composition (in wt %):

| Composition | (wt %) |
|---|---|
| $SiO_2$ | 63-83, |
| $Al_2O_3$ | 0-7, |
| $B_2O_3$ | 5-18, |
| $Li_2O + Na_2O + K_2O$ | 4-14, |
| $MgO + CaO + SrO + BaO + ZnO$ | 0-10, |
| $TiO_2 + ZrO_2$ | 0-3, and |
| $P_2O_5$ | 0-2. |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass ribbon, and the total amount of the total composition is 100 wt %.

According to one embodiment of the invention, the thin glass is an alkali metal aluminosilicate glass of the following composition (in wt %):

| Composition | (wt %) |
|---|---|
| $SiO_2$ | 40-75, |
| $Al_2O_3$ | 10-30, |
| $B_2O_3$ | 0-20, |
| $Li_2O + Na_2O + K_2O$ | 4-30, |
| $MgO + CaO + SrO + BaO + ZnO$ | 0-15, |
| $TiO_2 + ZrO_2$ | 0-15, and |
| $P_2O_5$ | 0-10. |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass ribbon, and the total amount of the total composition is 100 wt %.

More preferably, the alkali metal aluminosilicate glass of the present invention has the following composition (in wt %):

| Composition | (wt %) |
|---|---|
| $SiO_2$ | 50-70, |
| $Al_2O_3$ | 10-27, |
| $B_2O_3$ | 0-18, |
| $Li_2O + Na_2O + K_2O$ | 5-28, |
| $MgO + CaO + SrO + BaO + ZnO$ | 0-13, |
| $TiO_2 + ZrO_2$ | 0-13, and |
| $P_2O_5$ | 0-9. |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass ribbon, and the total amount of the total composition is 100 wt %.

Most preferably, the alkali aluminosilicate glass of the present invention has the following composition (in wt %):

| Composition | (wt %) |
|---|---|
| $SiO_2$ | 55-68, |
| $Al_2O_3$ | 10-27, |
| $B_2O_3$ | 0-15, |
| $Li_2O + Na_2O + K_2O$ | 4-27, |
| $MgO + CaO + SrO + BaO + ZnO$ | 0-12, |
| $TiO_2 + ZrO_2$ | 0-10, and |
| $P_2O_5$ | 0-8. |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass ribbon, and the total amount of the total composition is 100 wt %.

In one embodiment, the thin glass is an aluminosilicate glass having a low alkali content, with the following composition (in wt %):

| Composition | (wt %) |
|---|---|
| $SiO_2$ | 50-75, |
| $Al_2O_3$ | 7-25, |
| $B_2O_3$ | 0-20, |
| $Li_2O + Na_2O + K_2O$ | 0-4, |
| $MgO + CaO + SrO + BaO + ZnO$ | 5-25, |
| $TiO_2 + ZrO_2$ | 0-10, and |
| $P_2O_5$ | 0-5. |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass ribbon, and the total amount of the total composition is 100 wt %.

More preferably, the aluminosilicate glass of low alkali content according to the present invention has the following composition (in wt %):

| Composition | (wt %) |
|---|---|
| $SiO_2$ | 52-73, |
| $Al_2O_3$ | 7-23, |
| $B_2O_3$ | 0-18, |
| $Li_2O + Na_2O + K_2O$ | 0-4, |
| $MgO + CaO + SrO + BaO + ZnO$ | 5-23, |
| $TiO_2 + ZrO_2$ | 0-10, and |
| $P_2O_5$ | 0-5. |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass ribbon, and the total amount of the total composition is 100 wt %.

Most preferably, the aluminosilicate glass of low alkali content according to the present invention has the following composition (in wt %):

| Composition | (wt %) |
|---|---|
| $SiO_2$ | 53-71, |
| $Al_2O_3$ | 7-22, |
| $B_2O_3$ | 0-18, |
| $Li_2O + Na_2O + K_2O$ | 0-4, |
| $MgO + CaO + SrO + BaO + ZnO$ | 5-22, |
| $TiO_2 + ZrO_2$ | 0-8, and |
| $P_2O_5$ | 0-5. |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass ribbon, and the total amount of the total composition is 100 wt %.

Table 1 shows several typical embodiments of thin alkali-containing glasses which are intended to be chemically tempered.

TABLE 1

Embodiments of alkali-containing borosilicate glasses

| Composition (wt %) | Example 1 | Example 2 | Example 3 | Example 4 | Example 5 | Example 6 | Example 7 | Example 8 |
|---|---|---|---|---|---|---|---|---|
| $SiO_2$ | 80 | 64 | 70 | 61 | 68 | 70 | 67 | 60 |
| $Al_2O_3$ | 3 | 7 | 1 | 18 | 9 | 8 | 6 | 7 |
| $Li_2O$ | 0 | 0 | 0 | 5 | 0 | 0 | 0 | 0 |
| $Na_2O$ | 5 | 6 | 8 | 10 | 5 | 3 | 5 | 8 |
| $K_2O$ | 0 | 6 | 8 | 1 | 2 | 6 | 4 | 5 |
| $CaO$ | 0 | 0 | 7 | 1 | 2 | 0 | 0 | 0 |
| $BaO$ | 0 | 0 | 2.5 | 0 | 2 | 0 | 0 | 0 |
| $ZnO$ | 0 | 5 | 2.4 | 0 | 0 | 1 | 2 | 0 |
| $ZrO_2$ | 0 | 0 | 0 | 3 | 3 | 0 | 0 | 0 |
| $B_2O_3$ | 12 | 8 | 0.1 | 1 | 8 | 12 | 16 | 20 |
| $TiO_2$ | 0 | 4 | 1 | 0 | 0 | 0 | 0 | 0 |

$SiO_2$, $B_2O_3$, and $P_2O_5$ function as glass network formers. Their content should not be less than 40% for conventional methods, otherwise the glass sheet or glass ribbon cannot be formed and would become brittle and lose transparency. A higher $SiO_2$ content requires a higher melting and processing temperature during glass making, and therefore this content should normally be less than 90%. By adding $B_2O_3$ and $P_2O_5$ to $SiO_2$, the network properties can be modified and the melting and processing temperatures of the glass can be lowered. Also, the glass network formers have a strong impact on the coefficient of thermal expansion (CTE) of the glass.

Furthermore, the $B_2O_3$ in the glass network may form two different polyhedral structures that can be better adapted to the loading force from outside. An addition of $B_2O_3$ generally results in lower thermal expansion and a lower Young's modulus, which in turn leads to good thermal shock resistance and slower chemical tempering. Therefore, the addition of $B_2O_3$ to ultrathin glass may largely improve chemical tempering, and thin glass chemically tempered in this way can be used for practical applications on a larger scale.

$Al_2O_3$ functions as a glass network former and also as a glass network modifier. $[AlO_4]$ tetrahedrons and $[AlO_6]$ hexahedrons are formed in the glass network depending on the amount of $Al_2O_3$. They are able to adjust the ion exchange rate by altering the amount of space for ion exchange within the glass network. In case of an excessive amount of $Al_2O_3$, for example of greater than 40%, melting temperature and processing temperature of the glass become much higher and the glass tends to crystallize, which causes the glass to lose transparency and flexibility.

Alkali metal oxides such as $K_2O$, $Na_2O$, and $Li_2O$ function as glass processing modifiers and may destroy the glass network by forming non-bridging oxides within the glass network. An addition of alkali metals may reduce the processing temperature of the glass and increase the CTE of the glass. The presence of Na and Li is essential for ultrathin flexible glass that is intended to be chemically tempered, the ion exchange of $Na^+/Li^+$, $Na^+/K^+$, and $Li^+/K^+$ being a necessary step for tempering. The glass will not be toughened when it does not contain alkali metals itself. However, the total amount of alkali metals should not be greater than 30%, otherwise the glass network is completely destroyed without forming a glass. Another important factor is that thin glass should have a low CTE, and then the glass should not contain an excessive amount of alkali metals in order to meet this requirement.

Alkaline earth elements such as MgO, CaO, SrO, and BaO function as network modifiers and are capable of lowering the formation temperature of the glass. These elements may alter the CTE and Young's modulus of the glass, and the alkaline earth elements have a very important function for modifying the refractive index of the glass to meet special requirements. For example, MgO is able to lower the refractive index of glass, while BaO is able to increase the refractive index. The amount of alkaline earth elements in the manufacturing of glass should not be greater than 40%.

Some transition metal elements in the glass, such as ZnO and $ZrO_2$, have a function similar to that of the alkaline earth elements. Other transition metal elements, such as $Nd_2O_3$, $Fe_2O_3$, CoO, NiO, $V_2O_5$, $MnO_2$, $TiO_2$, CuO, $CeO_2$, and $Cr_2O_3$ function as coloring agents, so that the glass includes special photons or exhibits optical functions, e.g. color filter function or light conversion.

The invention will now be explained in more detail with reference to exemplary embodiments.

Examplary Embodiment 1

In a redrawing apparatus, a preform made of borosilicate glass and having a thickness of 6.8 mm and a net width of 400 mm is drawn into a thin glass film with a thickness of 50 μm. A heating zone made of precious metal is employed for this purpose. Approximately 30 mm below this heater, the furnace has a horizontal slot for introducing a scanning $CO_2$ laser beam. Without the laser, the ribbon has a viscosity of $4*10^6$ dPa·s at this location. The so produced ribbon is sensed transversely to the drawing direction using a chromatic confocal sensor. From the thickness distribution it is identified at which transverse position the glass has an excessive thickness. Based on this information, a scanning program is generated which includes location, laser power, and beam rate. At the thick locations, an average laser power of 16 watts is deposited. This allows to reduce the thickness by 10 μm in areas of excessive thickness.

Examplary Embodiment 2

In a down-draw apparatus, a glass ribbon with a thickness of 0.3 mm is drawn through a nozzle made of precious metal. A scanning laser beam is applied onto the glass ribbon through a slot. At this location, the glass has a viscosity of $6*10^5$ dPa·s without the heating by the laser. The so produced ribbon is sensed transversely to the drawing direction using a chromatic confocal sensor. From the thickness distribution it is identified at which transverse position the glass has an excessive thickness. Based on this information, a scanning program is generated which includes location, laser power, and beam rate. At the thick locations, an average laser power of 3 watts is deposited. This allows to reduce the thickness by 10 μm in areas of excessive thickness.

Examplary Embodiment 3

In a down-draw apparatus, a glass ribbon with a thickness of 0.3 mm is drawn through a nozzle made of precious metal. A scanning laser beam is applied onto the glass ribbon through a slot. At this location, the glass has a viscosity of $10^7$ dPa·s without the heating by the laser. The so produced ribbon is sensed transversely to the drawing direction using a chromatic confocal sensor. From the thickness distribution it is identified at which transverse position the glass has an excessive thickness. Based on this information, a scanning program is generated which includes location, laser power, and beam rate. At the thick locations, an average laser power of 37 watts is deposited. This allows to reduce the thickness by 10 μm in areas of excessive thickness.

Examplary Embodiment 4

In a down-draw apparatus, a glass ribbon with a thickness of 0.3 mm is drawn through a nozzle made of precious metal. A scanning laser beam is applied onto the glass ribbon through a slot. At this location, the glass has a viscosity of $6*10^5$ dPa·s under continuous laser heating of 500 watt over the entire net width. The so produced ribbon is sensed transversely to the drawing direction using a chromatic confocal sensor. From the thickness distribution it is identified at which transverse position the glass has a thickness that is too small. Based on this information, a scanning program is generated which includes location, laser power, and beam rate. At the thin locations, an average laser power of 3 watts less than in the rest of the ribbon is deposited. This allows to increase the thickness by 10 μm in areas where the thickness is too small.

BRIEF DESCRIPTION OF THE DRAWINGS

The invention will now be explained by way of example with reference to the figures wherein the same reference numerals denote the same elements and wherein.

DETAILED DESCRIPTION

Figure 1:
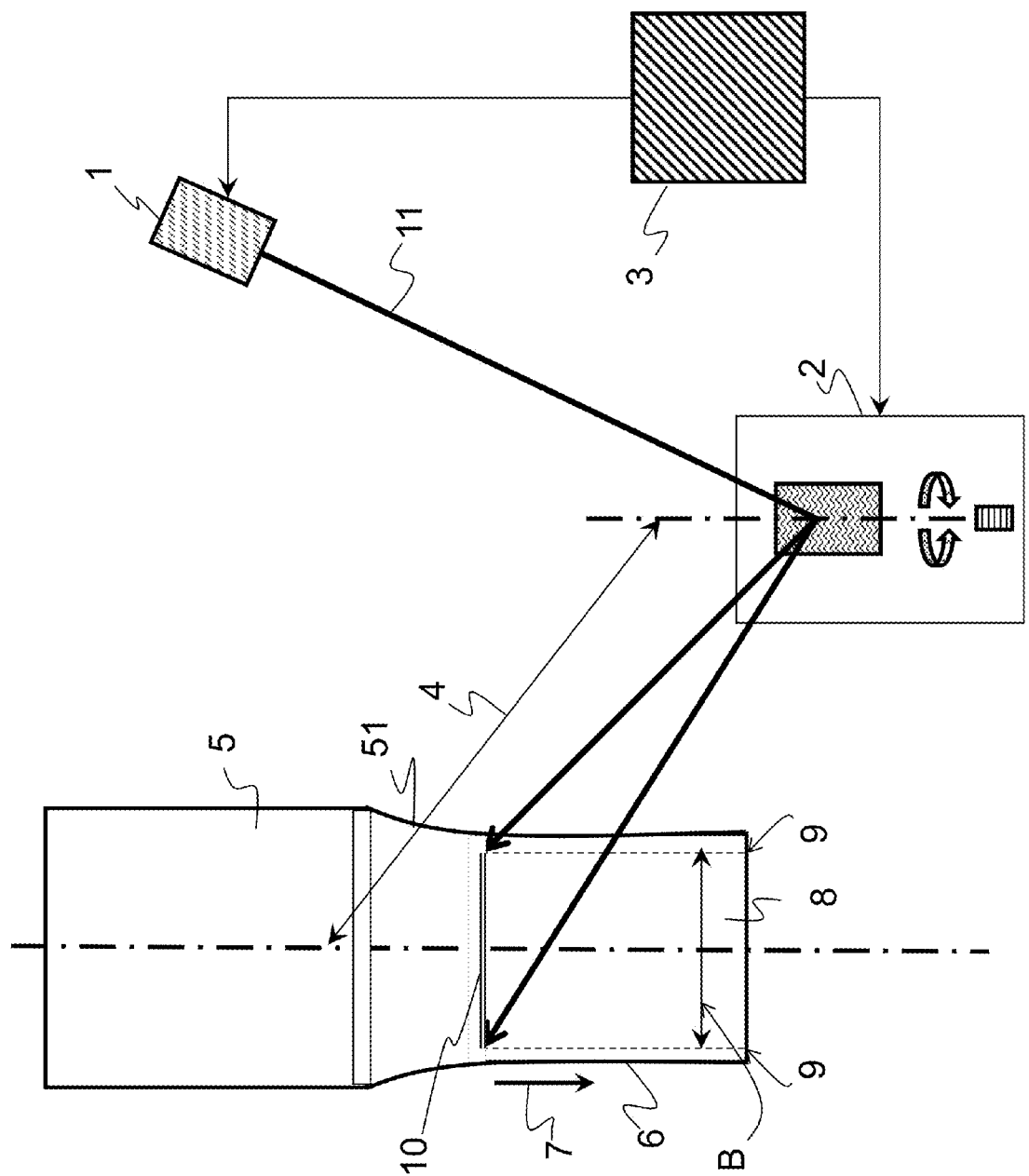
FIG. 1 shows the basic arrangement of glass ribbon, scanner, and laser in one embodiment of the method according to the invention.

FIG. 1 schematically illustrates the arrangement of the laser and the glass ribbon in the method of the invention. Shown are the device 1 for generating a laser beam 11, and scanner 2 which is equipped with a polygon mirror wheel here, by way of example. Laser power and scanner angle are controlled by controller 3. Furthermore, preform 5 of the glass ribbon is illustrated. By way of example, preform 5 is a monolithic glass preform here. Hence, the method for producing a glass ribbon is a so-called redrawing process in the illustrated example. Here, the shaping of the glass ribbon 6 is achieved by selective heating of the preform 5 in the schematically illustrated deformation zone 51 while the glass ribbon is moved in the direction indicated by arrow 7. The deformation zone is defined as the zone in which the glass is capable of being shaped, that is to say where the glass has a viscosity between $10^4$ and $10^9$ dPa·s, preferably between $10^4$ and $10^8$ dPa·s. The resulting glass ribbon comprises a so-called quality portion 8 in which the properties of the resulting glass ribbon 6 are within the predefined specifications for the product properties. This quality portion 8 has a width B and is delimited by edges 9 of the quality portion 8. Outside quality portion 8, edge rolls might contact the surface of the glass ribbon, for example, so that in this case the glass will not have a sufficient surface quality there. Furthermore, the edge portions of the glass ribbon usually exhibit further uneven surface areas, for example in the form of thickened edges, also referred to as borders. Also indicated is the optical distance 4 between the laser and the glass ribbon. In the context of the present invention, optical distance refers to the length of the optical path between the glass ribbon and the scanner mirror. Therefore, the terms "optical distance" and "optical path length" are used synonymously within the context of the present invention. The optical path may as well be shorter if optical components, e.g. in the form of mirrors and/or lenses, are utilized between the scanner mirror and the glass ribbon, which enlarge the angular deflection of the scanner mirror. In such a case, the specified distance then refers to the "optical lever", that is the distance which would be required to achieve the same deflection of the laser beam without the one or more optical component(s).

Laser beam 11 is directed across the glass ribbon 6 by scanner 2 along path 10, so that the laser scans over the net width B of the quality portion 8 of the glass ribbon 6. Along path 10, the glass ribbon 6 has a viscosity between $10^4$ and $10^9$ dPa·s, preferably between $10^4$ and $10^8$ dPa·s.

More generally, without being limited to the example illustrated herein, a glass ribbon 6 may as well be produced by being directly drawn from a melt, for example in a so-called down-draw process or overflow fusion process.

Figure 2:
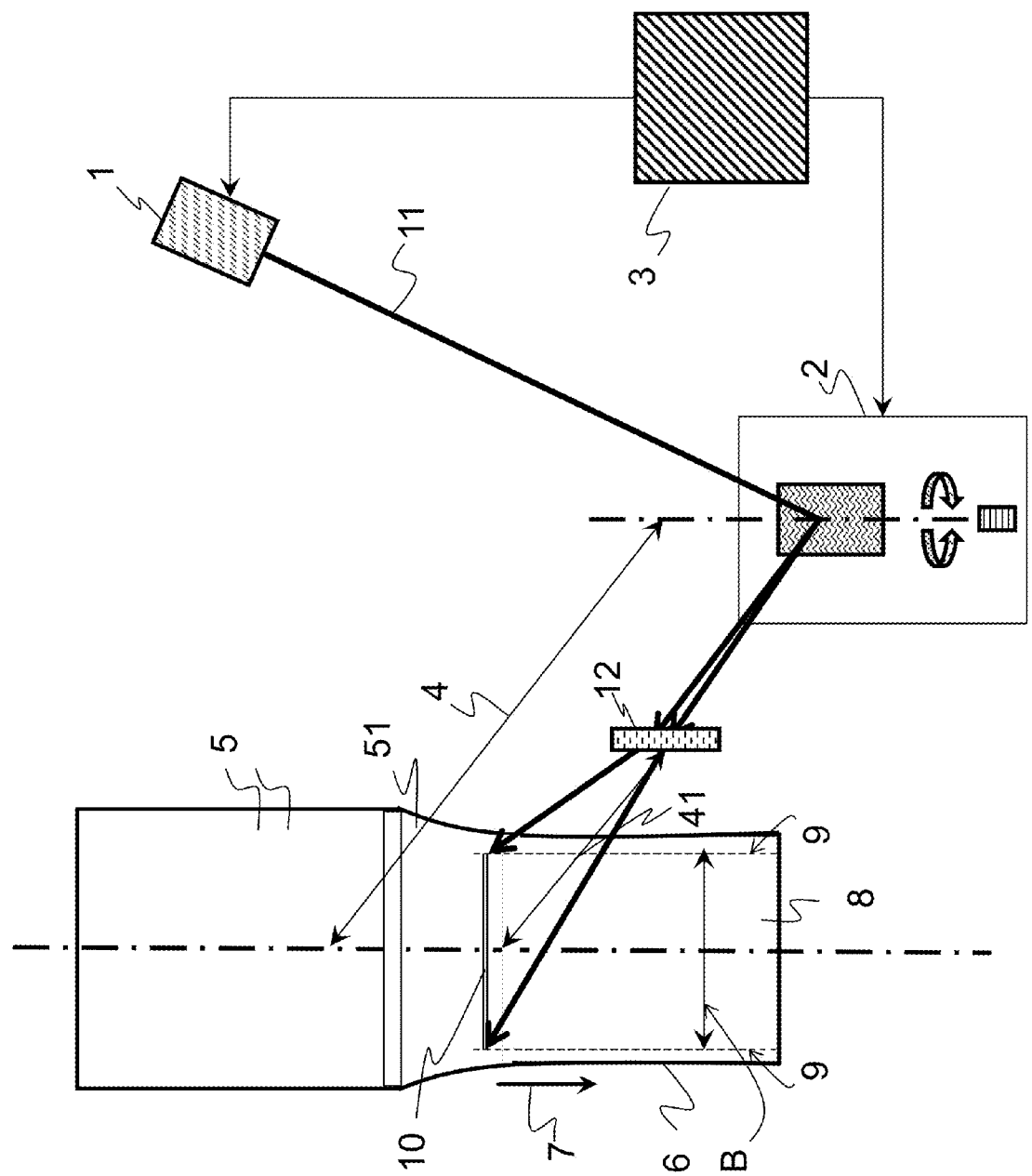
FIG. 2 shows the basic arrangement of glass ribbon, scanner, and laser according to a further embodiment of the invention, with additional optics between the scanner and the glass ribbon for enlarging the optical lever.

FIG. 2 is a further schematic view of an arrangement of the laser and the glass ribbon according to another embodiment of the inventive method. In contrast to the method illustrated in FIG. 1, optics 12 are additionally introduced into the beam path between scanner 2 and glass ribbon 6 in order to enlarge the optical lever for a given distance 41 between the glass ribbon and the scanner mirror.

Figures 3A, 3B, 3C:
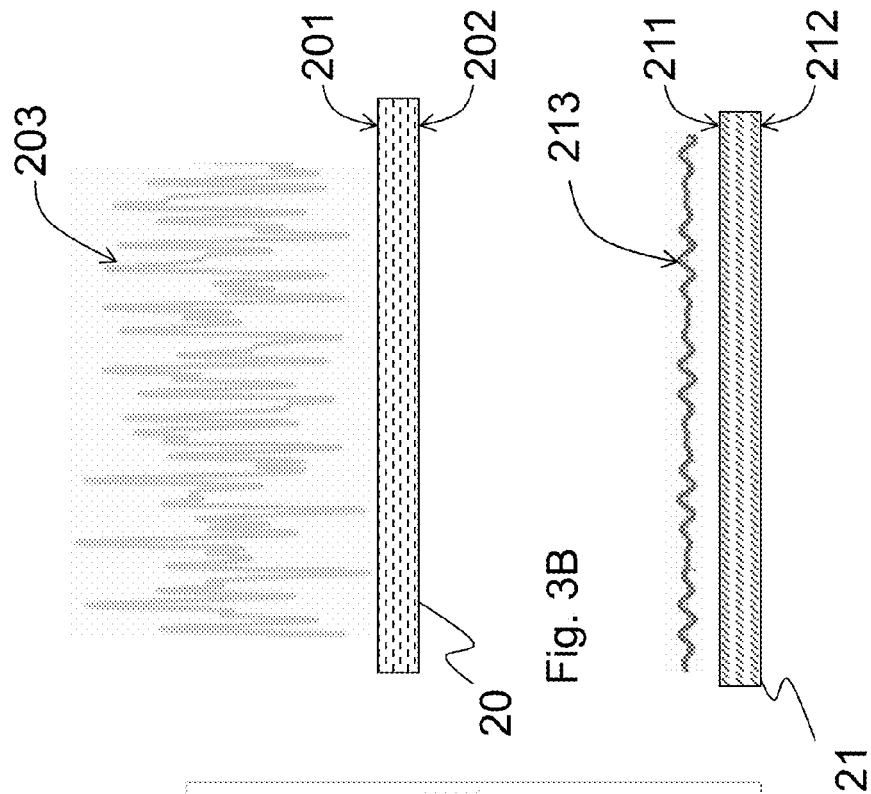
FIGS. 3A, 3B, and 3C schematically illustrate thickness profiles for a glass ribbon produced by the method according to the invention and for a glass ribbon not produced by the method according to the invention.

FIG. 3A schematically shows a diagram of two thickness profiles 203, 213 for a glass sheet 21 obtained according to the invention and for a glass sheet 20 not produced according to the invention. The x-axis represents the position of the sensed location on the glass sheet. The y-axis represents the deviation from the nominal thickness in arbitrary units, with nominal thickness at 0. It can be clearly seen that the thickness profile 203 for a glass sheet 20 which was produced without thickness correction according to the method of the invention exhibits significantly stronger deviations from the nominal thickness than thickness profile 213 for a glass sheet 21 which was produced by the method of the invention.

FIG. 3B schematically shows a glass sheet 20 not produced according to the invention, which has faces 201, 202. Furthermore, the thickness profile 203 of glass sheet 20 is also shown here. FIG. 3C schematically illustrates glass sheet 21 with faces 211 and 212, and glass sheet 21 was obtained using the method of the invention for thickness correction. Moreover, thickness profile 213 is shown. The two thickness profiles 203 and 213 are drawn with the same scale. Again, it can be clearly seen that the glass sheet 21 obtained according to the invention exhibits clearly smaller deviations from the nominal thickness than glass sheet 20 which was produced without thickness correction.

LIST OF REFERENCE NUMERALS

1 Device for generating a laser beam
10 Scanning distance of the laser
11 Laser beam
12 Optics for increasing the optical lever
2 Scanner
3 Controller
4 Optical distance/optical path length
41 Actual distance scanner mirror to glass ribbon
5 Preform
51 Deformation zone
6 Drawn glass ribbon
7 Drawing direction
8 Quality portion
9 Limits of quality portion
20 Glass sheet without thickness correction
201,202 Faces of glass sheet 20
203 Thickness profile of glass sheet 20
21 Glass sheet with thickness correction
211,212 Faces of glass sheet 21
213 Thickness profile of glass sheet 21

What is claimed is:

1. A method for controlling thickness of a glass ribbon, comprising:
providing a glass ribbon by drawing from a melt or redrawing from a preform with a drawing rate ($v_{GB}$) and an average thickness (D) in a net portion;
predefining a nominal thickness of the glass ribbon;
determining a thickness of the glass ribbon over an entire net width (B);
determining at least one deviation of the thickness from the nominal thickness;
identifying an area on the glass ribbon of the at least one deviation; and
heating the area using a laser beam to cause the area to attain the nominal thickness, wherein the heating further comprises controlling at least a power of the laser beam, a duration of irradiation of a laser beam, or a wavelength of the laser beam as a function of the thickness,
wherein the laser is equipped with a scanning head configured to scan the entire net width of the glass ribbon; and
wherein the following relationship applies between the entire net width (B), the drawing rate ($v_{GB}$), a beam diameter (D) of the laser beam, a scanning rate of a laser ($v_{Las}$), and a correction factor k:

$$2 \cdot k \cdot v_{GB} \cdot B < D \cdot v_{Las}, \text{ and}$$

wherein the correction factor k is at least equal to or greater than 1 and the entire net width and the beam diameter are given in meters and the drawing rate and the scanning rate of the laser are given in meters per second.

2. The method as claimed in claim 1, wherein the correction factor k is at least equal to or greater than 10.

3. The method as claimed in claim 1, wherein, prior to the heating, the area has a viscosity in a range between $10^4$ and $10^9$ dPa·s, and wherein areas of excessive thickness are subjected to a greater laser power than areas of appropriate or undersized thickness.

4. The method as claimed in claim 1, wherein the scanning head has an optical lever or a length of the optical path between the glass ribbon and a scanner mirror of between at least 1.8 m and at most 5.0 m.

5. The method as claimed in claim 1, wherein the laser power is at most 3000 W.

6. The method as claimed in claim 1, wherein the laser beam acts on a deformation zone of the glass ribbon.

7. The method as claimed in claim 1, wherein the step of providing the glass ribbon by drawing or redrawing comprises drawing or redrawing by virtue of a weight of the glass ribbon.

8. The method as claimed in claim 1, wherein the laser is a $CO_2$ laser.

9. The method as claimed in claim 1, wherein the step of determining of the thickness comprises measuring selected from the group consisting of an interference measurement, a chromatic confocal measurement, a white light topography measurement, a white light interferometry measurement, and combinations thereof.

10. The method as claimed in claim 1, further comprising directing the laser beam by a galvanometer scanner and/or a polygon mirror wheel.

\* \* \* \* \*